(No Model.) 4 Sheets—Sheet 1.

J. W. MARK.
ILLUMINATING TILE.

No. 436,085. Patented Sept. 9, 1890.

Witnesses:
Jas. C. Hutchinson
Henry C. Hazard

Inventor:
John W. Mark, by
Prindle & Russell his Attys (No Model.) 4 Sheets—Sheet 2.

J. W. MARK.
ILLUMINATING TILE.

No. 436,085. Patented Sept. 9, 1890.

Witnesses:
Jas. E. Hutchinson.
Henry C. Hazard.

Inventor
John W. Mark by
Crindle and Russell his Attys (No Model.) 4 Sheets—Sheet 3.
J. W. MARK.
ILLUMINATING TILE.
No. 436,085. Patented Sept. 9, 1890.
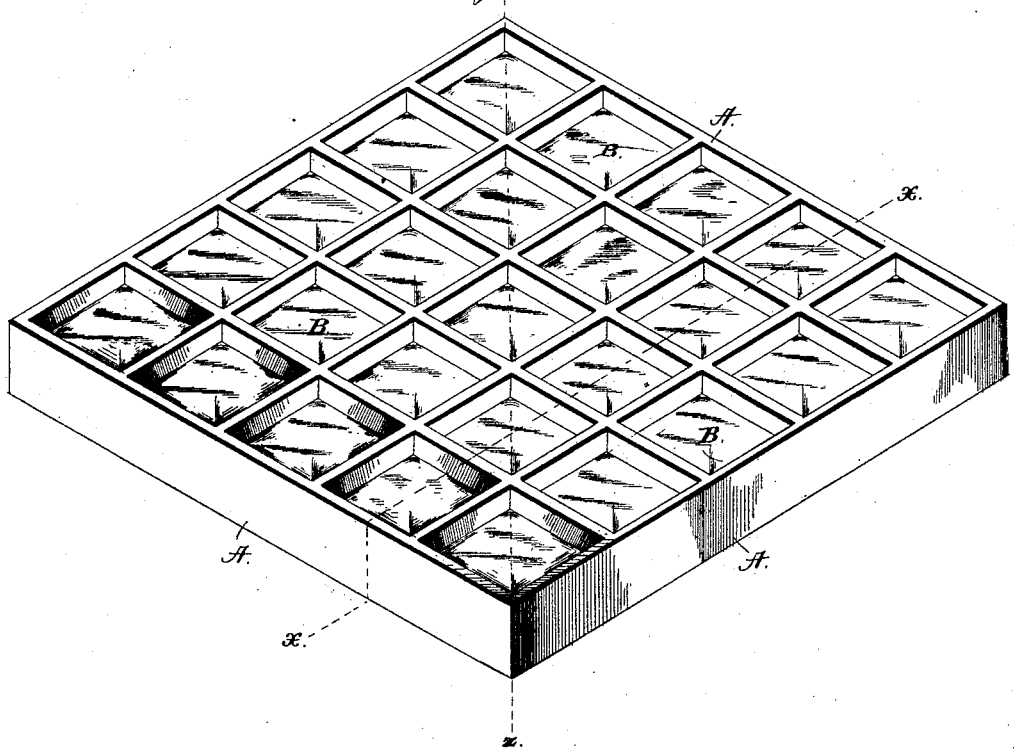
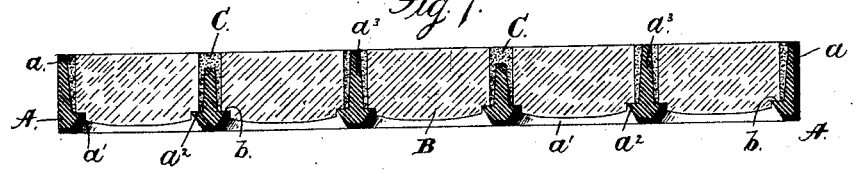
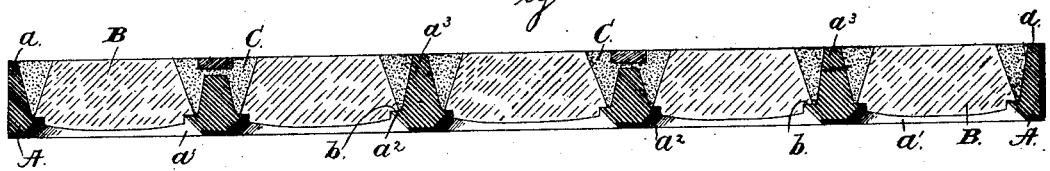
Witnesses:
Jas. E. Hutchinson.
Henry C. Hazard.
Inventor:
John W. Mark by
Crindle & Russell his Attys (No Model.) 4 Sheets—Sheet 4.
J. W. MARK.
ILLUMINATING TILE.
No. 436,085. Patented Sept. 9, 1890.
Fig. 9.
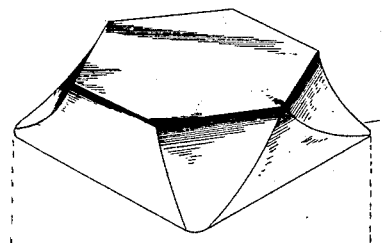
Fig. 10.
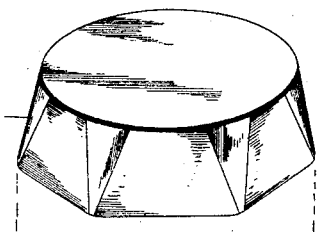
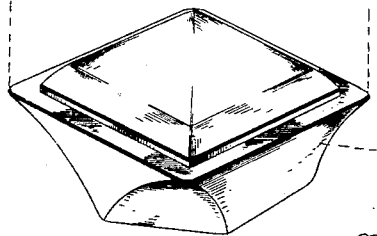
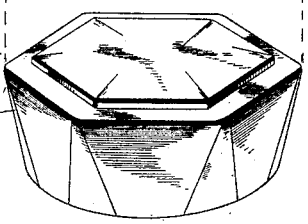
Fig. 11.
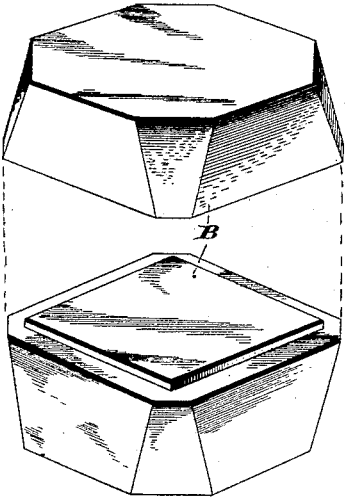
Witnesses:
Jas. E. Hutchinson.
Henry C. Hazard.
Inventor
John W. Mark, by
Dindle & Russell, his Attys

UNITED STATES PATENT OFFICE.

JOHN W. MARK, OF NEW YORK, N. Y.

ILLUMINATING-TILE.

SPECIFICATION forming part of Letters Patent No. 436,085, dated September 9, 1890.

Application filed July 24, 1889. Serial No. 318,475. (No model.)

*To all whom it may concern:*

Be it known that I, JOHN W. MARK, of New York, in the county of New York and State of New York, have invented certain new and useful Improvements in Illuminating-Tiles; and I do hereby declare that the following is a full, clear, and exact description thereof, reference being had to the accompanying drawings, in which—

Figure 1:
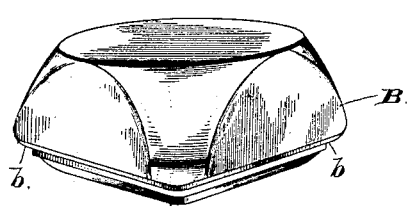
Figure 2:
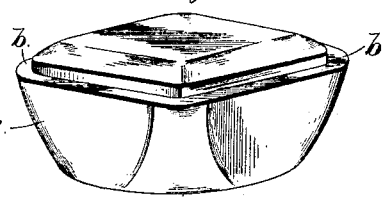
Figure 3:
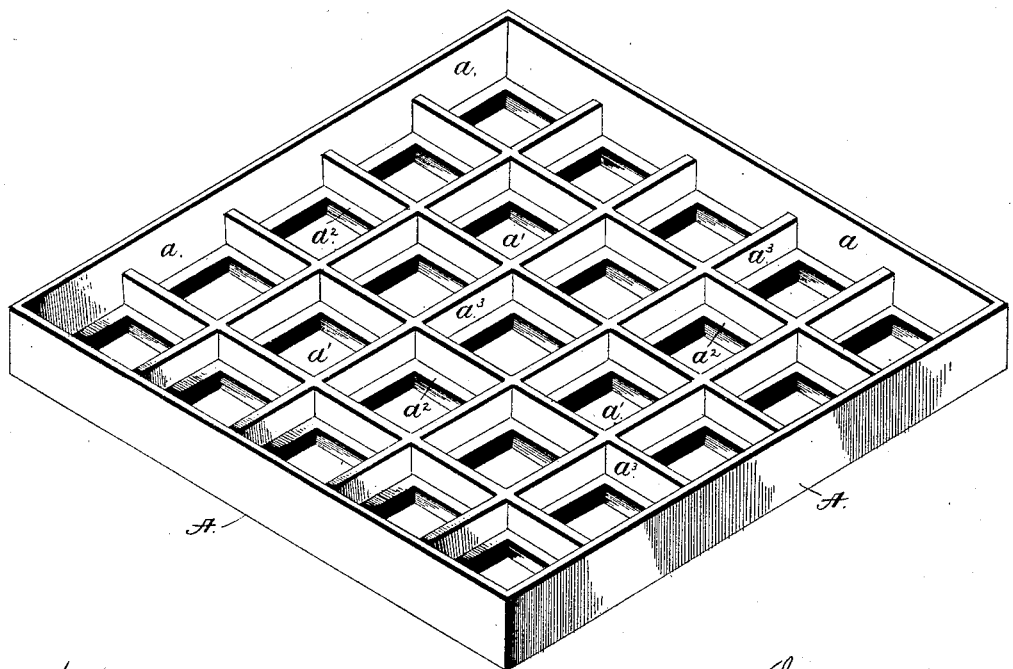
Figure 4:
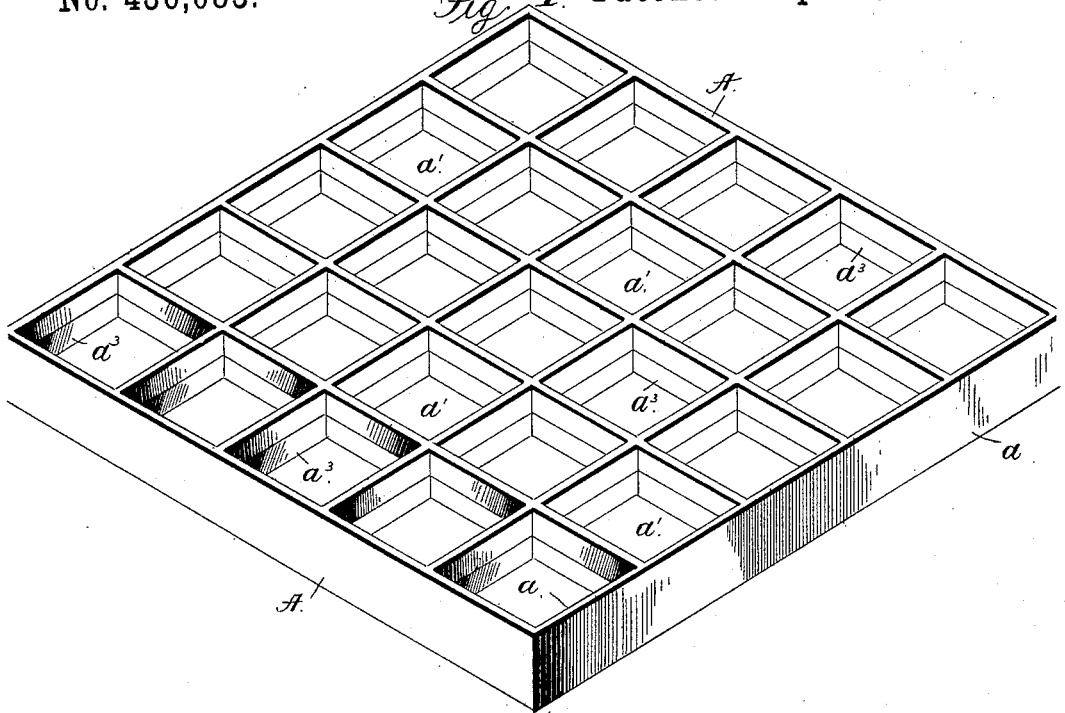
Figure 5:
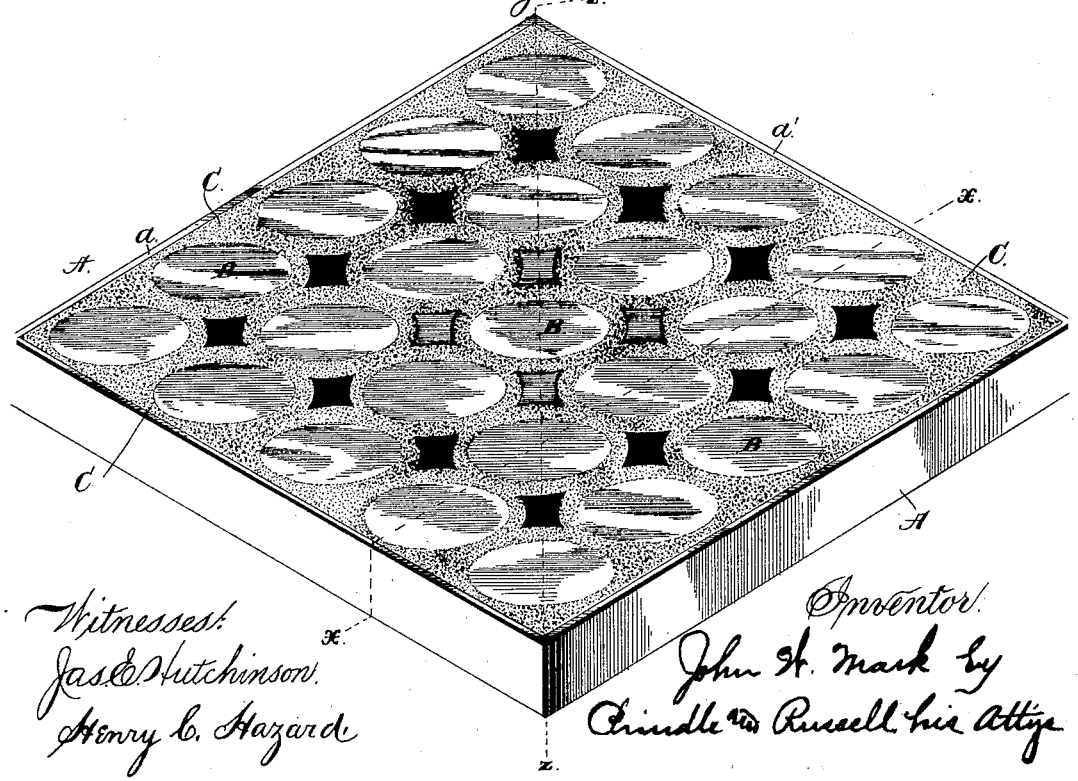

Figures 1 and 2 are perspective views from the upper and lower sides, respectively, of my improved lens. Figs. 3 and 4 are like views of the metal portion of the tile before glazing. Figs. 5 and 6 are perspective views of the completed tile from the upper and lower sides, respectively. Figs. 7 and 8 are respectively sections upon lines $x\ x$ and $z\ z$ of Figs. 5 and 6; and Figs. 9, 10, and 11 are each perspective views of the upper and lower sides of modified forms of lenses.

Letters of like name and kind refer to like parts in each of the figures.

The design of my invention is to secure increased light-transmitting capacity for illuminating-tiles; and to such end my said invention consists in the construction and combination of parts, as hereinafter specified and claimed.

In the carrying of my invention into practice I employ a metal plate or tile A, which has an inclosing-flange $a$, and is provided with series of light-openings $a'$ and $a'$, that are preferably square in plan view, and are each provided around or near the lower end with a ledge $a^2$, which is adapted to furnish a support for a lens B. The lens B has its inner end conformed to the size and shape of a light-opening $a'$, and at such point is provided with a rabbet $b$, that is adapted to fit over the ledge $a^2$ when said lens is in position. Below said rabbet said lens has, preferably, an inward swell, as shown in Figs. 2, 7, and 8, while from said ledge outward said lens changes in form until it is preferably round at its outer end and has a considerably smaller area than at its inner end. The lenses B and B being placed within the light-openings $a'$ and $a'$ of the tile A, the spaces between the bodies of said lenses and the walls of the said light-openings and between the upper portions of said lenses and the flange $a$ of said tile are filled with cement C, or other suitable material, which may be applied in a plastic state, and will afterward harden, so as to secure said lenses firmly in place and form water-tight joints between the same and said tile. The bars $a^3$ and $a^3$ between the light-openings of the tile A extend to and form part of the surface of said tile, which gives to each lens its own compartment and enables the same to be removed and replaced without disturbing any of the other lenses or the adjacent concrete; but, if desired, said bars may be made lower, so that when the concrete C is in place the said bars will be entirely covered and the surface of the tile show nothing but glass and concrete. In consequence of the inwardly-increasing area of the lens A its light-transmitting area is largely in excess of what would be possible if the inner and outer ends were of the same size, while the outer end of said lens bears such relation to the surrounding concrete as to render the surface of the tile entirely safe and secure for walking purposes.

The form of lens shown in Figs. 1 to 8 is preferably employed; but, if desired, other forms may be used in which the same principle is involved. One of such modifications is shown in Fig. 9, in which the inner end of the lens is square and its outer end six-sided. Another form (seen in Fig. 10) has a six-sided inner end and a round outer end, while in Fig. 11 is shown a third form, in which the inner end is square with the corners removed and the outer end is eight-sided. The shapes of the outer ends of the lenses relative to the tile-openings in which they are placed are such as to afford ample space for cement, while the inner ends thereof are made to conform to the shapes of the tile-openings, which where the latter are square materially increases the area of illuminating-surface as compared with round lenses of like diameter.

In regard to all the forms of lenses shown it will be observed that the vertical sides or faces are even surfaces—that is, surfaces uninterrupted by projections or angles throughout their vertical extent—which construction permits of the transmission of light without interruption through the lens to the whole of the inner end thereof. To secure this formation, I construct each lens so that its periphery is composed of a series of plane surfaces, which correspond with the polygonal base thereof, and chamfer the intermediate angles, so as to merge them with said plane surfaces into the top or outer end.

Having thus described my invention, what I claim is—

1. A lens for illuminating-tiles whose bottom has an angular or polygonal form, whose top is of different shape therefrom, and whose peripheral side connecting the top and bottom is composed of a series of plane surfaces corresponding with the polygonal base, the intermediate angles being chamfered to merge with said plane surfaces into the top, substantially as and for the purpose specified.

2. A lens for illuminating-tiles whose bottom has an angular or polygonal form, but whose top is circular, and its peripheral side connecting said top and bottom composed of a series of plane surfaces corresponding with its polygonal bottom, the intermediate angles being chamfered to merge with said plane surfaces into the circular top, substantially as and for the purpose shown.

3. An illuminating-tile provided with angular light-openings, each containing a lens of corresponding shape at its bottom, but having a top of different shape therefrom peripherally, the peripheral sides connecting said top and bottom being composed of a series of plane surfaces corresponding with the angular bottom, the intermediate angles being chamfered to merge with said plane surfaces into the circular top, substantially as and for the purpose set forth.

In testimony that I claim the foregoing I have hereunto set my hand this 17th day of July, 1889.

JOHN W. MARK.

Witnesses:
 CHAS. W. MARK,
 WILLIAM ACKERMANN.